United States Patent [19]

Abrams

[11] Patent Number: 5,277,819

[45] Date of Patent: Jan. 11, 1994

[54] COLD DRAFT BEER FILTER MEMBRANE CLEANING PROCESS

[75] Inventor: Howard Abrams, Plainview, N.Y.

[73] Assignee: Pall Corporation, Glen Cove, N.Y.

[21] Appl. No.: 892,767

[22] Filed: Jun. 3, 1992

[51] Int. Cl.⁵ .............................................. B01D 61/20
[52] U.S. Cl. ................................. 210/636; 210/500.38
[58] Field of Search ............... 210/636, 500.38, 321.69

[56] References Cited

U.S. PATENT DOCUMENTS 4,769,148  9/1988  Fibiger et al. .................. 210/500.38

OTHER PUBLICATIONS

Brochure of Echolab, Inc. for "ULTRASIL 56" ©1990.

*Primary Examiner*—Frank Spear
*Attorney, Agent, or Firm*—Leydig, Voit & Mayer

[57] ABSTRACT

A method for cleaning a microporous, water-wettable, alcohol-insoluble, polyamide membrane used for cold beer filtration using a dilute, alkaline solution which is non-destructive to the membrane and the filtration equipment and which removes and/or de-absorbs and otherwise renders loaded proteins, polysaccharides and other biomolecules flushable from the membrane with water.

20 Claims, No Drawings

COLD DRAFT BEER FILTER MEMBRANE CLEANING PROCESS

TECHNICAL FIELD

This invention relates to a cleaning method to remove chill haze, e.g., proteins and polysaccharides from loaded microporous polyamide membranes by using a dilute alkaline solution at temperatures which are non-damaging to the membranes. More particularly, this invention provides a filter membrane cleaning process which restores filtering effectiveness and bacteria removal to acceptable titer levels of microporous polyamide membranes used in cold beer filtration and which is compatible with cleaning processes employed for conventional beer filtration apparatus.

BACKGROUND OF THE INVENTION

Non-pasteurized, cold filtered draft beer is becoming an increasingly popular substitute for heat pasteurized beer. Beer is a complex liquid which contains a considerable amount of suspended solids and a number of organic constituents obtained from fermentation. Beer, being a complex solution, requires filtration in order to obtain a product of satisfactory quality. Commercial beer production generally involves multiple filtration steps where the first step is employed to remove larger particles and residues from the natural products associated with fermentation, "dirt." Often times a process may call for multiple dirt removal filtration steps for a particular type of beer. However, even following such steps the resulting filtrate is not necessarily safe for drinking since it may include an unacceptably high bacteriological titer.

For many years the industry has relied on heat pasteurization to reduce the amount of bacteria in draft beer to acceptable levels; those meeting governmental and industry standards. Heat pasteurization kills bacteria existing in the fermentation broth which is then subject to coarse filtration to remove relatively large suspended matter, e.g., 0.65 $\mu$m and larger. However effective to reduce bacterial contamination, heat pasteurization forms many undesirable by-products which adversely affect the quality (taste) of the beer. Thus, the industry with increasing frequency is turning to cold filtration techniques, i.e., filtration occurring at about 33° F.

In cold filtration processes, the application of heat is avoided which, in turn, avoids the formation of undesirable heat by-products. However, since heat is not employed to kill the ambient bacteria in raw beer ferment, filtration is relied on to provide the requisite degree of bacterial removal, at least to a titer satisfying the various mandatory standards. For example, the titer of lactose bacillus must be reduced significantly in order to meet such standards. To achieve such removal, the filter should have at least a 0.45 $\mu$m rating which contrasts with the coarser 0.65 $\mu$m rating for heat pasteurized beer.

In order to provide a reasonable degree of processing flexibility in selecting filtration parameters, the beer industry has turned to, among other things, supported polymeric membranes for cold beer filtration. Such membranes, such as those formed from polyvinylidene fluoride (PVDF) are particularly suited for cold beer filtration since the performance ratings are easily modified and the filters can be employed with typical batch processing equipment used for beer fermentation.

Thus, by departing from heat pasteurization and favoring cold filtering, the filters must provide increased performance criteria. Accordingly, cold filtration processes involve a higher degree of filtration to produce an effective bacterial removal rating in order to meet rigorous governmental pure food standards and sometimes more stringent industry standards while preserving the taste and quality of the beer.

The significant problem associated with the finer filters required for cold beer filtration is that they clog more easily than their coarser counterparts used for heat pasteurized beer. Clogging is due to protein and polysaccharide loading. Accordingly, supported polymeric membranes for cold beer filtration must either be disposed of or cleaned for re-use of the filters. To clean the filter membrane requires removal of proteins and polysaccharides sorbed in the membrane pores which cause membrane loading and eventual undesirable pressure rise in the filtering apparatus. Loading of chill haze constituents, e.g., proteins and polysaccharides occurs when such molecules which are smaller than the pore size of the particular filter but aggregates in the pores and thereby reduce the effective flow rate and uniformity of flow within the filter. In order to remove such loaded proteins and polysaccharides, techniques have been developed to clean such membranes and de-absorb and eliminate such macromolecules.

Commonly, the industry has turned to enzymes and detergents for cleaning PVDF (polyvinylidene fluoride) filters. Cleaning such filters relies on various oxidizers employed in the enzyme or detergent. PVDF membranes are generally expensive and more difficult to manufacture and utilize than, for example, polyamide (nylon) membranes. However, to date, polyamide (nylon 66) membranes, while being less expensive, have been shunned for cold draft beer filtration, since commonly employed microporous membrane cleaning techniques, i.e., enzymes and detergent, are generally inapplicable and have proven unsuccessful with polyamide membranes. Accordingly, once polyamide membrane filter reaches a terminal $\Delta p$ (pressure drop), the filter cartridges must be removed from the filtration tank, replaced, and the spent cartridges disposed of. This is both labor intensive and unduly costly.

The physical characteristics, apart from the cleaning problem, of polyamide membranes make them ideally suited for cold beer filtration since polyamide membranes provide process control flexibility, resist pressure deformation, provide uniform filtration characteristics for reducing bacteriological titers to satisfactory levels, are reliable and relatively inexpensive, and are easily adapted for different filter configuration. Furthermore, such polyamide membranes exhibit solution shape stability, substantially uniform flow characteristics, and substantially uniform bacteriological removal, i.e., pore ratings. An exemplary water-wettable, alcohol-insoluble, skinless, cast, polyamide membrane of the type for use in the instant invention is disclosed in U.S. Pat. No. 4,340,479, issued to Pall et al., and which is incorporated by reference herein. The polyamide (Nylon 66) membrane exhibits excellent performance characteristics applicable for use in cold draft beer filtration process. However, as noted, these polyamide membrane filters have not lent themselves to effective cleaning using detergents and enzymes; the commonly employed beer filter cleaning agents.

Microporous membranes conventionally when used for large scale cold draft beer filtration are generally disposed in an array fixed in a used filtration tank filter apparatus. Such tank filters may include an array of, for example, 80 forty inch filter cartridges. A tank of this type can be characterized by a filter assembly with an upper housing portion and a lower housing portion hinged to one another. The lower housing portion contains a flanged inlet port and a flanged drain port opening directly to a chamber. A centrally disposed standpipe in the chamber is in fluid communication with a flanged outlet port formed in the lower chamber and extending upwardly to and above the plane of separation between the upper and lower housing portions of the chamber. An easily accessible and replaceable, removable, sealed, filter array support with an array of stacked membrane filter cartridges, is positioned within the housing portions. The array support includes a lower perforated support plate and an upper, fluid impervious "tube sheet" or separation sheet, including a gasketed central opening dimensioned to complement the standpipe, is disposed and sealed between the upper and lower housing portions to provide a fluid tight seal therebetween.

In operation, the drain is blocked and the fluid, in this case, raw draft beer, is pumped into the lower housing portion. The fluid is confined, under pressure, in the lower chamber by the "tube sheet" and is constrained to flow only through the membrane filter elements. Thus, the beer passes from the outside of the cartridges to the inside of the cartridges through the microporous membrane and into the upper housing portion. The filtered beer collects in the upper housing portion and is removed, by gravity draining, through the outlet port in fluid communication with the standpipe.

The above arrangement is particularly useful since the filter array is cleanable either in place, or by opening the assembly by pivoting the upper and lower housing along the hinge and removing the filter array. If cleaned in place, the inlet source for raw beer is closed, and a cleaning fluid is introduced into the lower chamber. Sludge can be drained from the lower chamber drain as well as excess cleaning solution. The cleaning and rinsing fluid which passed through the filter cartridge to the upper chamber is drained from the assembly through the standpipe.

The beer brewing industry, commonly cleans brewing and processing equipment with a dilute caustic (NaOH) solution at elevated temperatures. Conventional membranes employed in beer filtration such as PVDF are not compatible with caustic solutions, i.e., the membranes will be damaged. Therefore, the membrane cartridges are either discarded or special provisions must be made to clean the filter cartridge units, alone apart from the tank and other filtering apparatus.

Finally, due to the inherent variations in different beers, there is no one uniform standard for filters used in cold beer filtration. Starting products are not identical, the bacterial involved in the fermentation and beer manufacturing process are not identical, and the final filtered beers are not identical. Accordingly, filter requirements differ from beer-to-beer since they are governed by the size of the bacteria which, in turn, are governed by the particular process employed for a particular beer. Thus, the performance characteristics and requirements for filters associated with cold draft beer filtration processes are not universal.

DISCLOSURE OF THE INVENTION

This invention is directed to a cold beer filter cleaning process for prolonging the useful life of microporous, water-wettable, polyamide (Nylon) membranes used in cold beer filtration.

It is an object of this invention to provide an effective cleaning method for de-sorbing and removing proteins and polysaccharides loaded in the membrane pores without damaging the filter membrane or the filtering apparatus.

It is an object of this invention to overcome problems associated with prior art cold beer filtration.

It is another object of this invention to provide a cleaning process for a microporous membrane filter unit employed in cold beer filtration which is compatible with cleaning solutions used for the filtration equipment.

Still another object of this invention is to provide a cleaning process which rejuvenates a microporous membrane to satisfy bacterial titer reduction for use in cold beer filtration.

A further object of the invention is to increase cleaning efficiencies and reduce the cost associated with replacement of microporous membrane filter members for cold beer filtration.

These and other objects were satisfied by a method for cleaning a polyamide microporous membrane filter used in filtering beer, comprising the steps of: passing a dilute alkaline solution through the filter at a temperature which is at least room temperature but does not exceed a temperature which is destructive to the membrane in order to remove proteins and polysaccharides loaded in the membrane, and flushing the filter membrane with water.

By practice of this invention, surprisingly, it has been found that the microporous polyamide membranes can be cleaned without degrading performance of the cartridge. As such, it represents a significant cost savings and reduces the solid waste caused by discarding spent filter elements.

Other objects and advantages of the present invention will become apparent from the detailed description given hereinafter. It should be understood, however, that the detailed description and specific embodiments are given by way of illustration only, since various changes and modifications within the spirit and scope of the invention will become apparent from the detailed description.

MODES FOR CARRYING OUT THE INVENTION:

In practice, it is preferred in cold beer filtration to use a pleated microporous membrane. The pleated configuration is preferred to maximize the filter surface area. Due to its various performance characteristics, a supported pleated, porous polyamide membranes, such as Nylon 66 (polyhexamethylene adipamide), is the preferred filter medium for cold draft beer filtration. An exemplary membrane for practice of this invention is disclosed in U.S. Pat. No. 4,340,479. Preferably, the polyamide membrane is supported on both its upstream and downstream sides with a coarsely porous sheet having a low resistance to edgewise flow, for example, a non-woven sheet of polyester fibers such as Reemay ®. While both layers sandwich the membrane to provide support, the upstream fibers also facilitate more uniform flow across the surface of the membrane and the downstream layer likewise facilitates drainage.

Given the above-description of the polyamide membrane which is subject to this invention, the cleaning procedure is now described.

Surprisingly, it was discovered that the polyamide membranes could withstand treatment with dilute caustic solutions at elevated temperature. Furthermore, such solutions were able to cause the de-sorption of proteins, polysaccharides, and other biomolecules from the pores of a 0.45 μm–0.8 μm membrane. In other words, the proteins, etc. would dislodge from the membrane pores and be flushed out of the membrane. While the precise reactions are not known, it is believed that the caustic solution degrades the biomolecules into smaller molecules which can then be flushed out of the membrane. A further significant aspect of this invention is the compatibility of the process with cleaning techniques currently used in the beer brewing industry. The use of a dilute caustic solution for cleaning beer membrane filter cartridges provides the additional advantage of complementing the use of dilute caustic solutions employed by the brewing industry to clean equipment generally.

Furthermore, use of dilute caustic solutions is less expensive than detergents, etc. currently employed for membrane cleaning and the caustic solution is not as harmful to the environment. In practice the caustic solution can be recycled in the tank filter to minimize the amount of waste effluent and, therefore, water pollution.

General Procedure Followed in the Examples

The invention entails passing a warm (room temperature to about 160° F.), dilute caustic solution through the membrane filter. The solution can be, for example, 0.1 to 3 Molar or 1%–10% by weight NaOH. The strength of the solution is limited so as not to impair membrane integrity or to damage the membrane. Generally there is a reciprocal association between temperature and concentration; the warmer the solution, the lesser its strength.

So long as the solution is caustic, it can include a number of different constituents, e.g., sodium hydroxide (NaOH), potassium hydroxide (KOH), calcium hydroxide (Ca(OH)$_2$), and mixtures thereof. To facilitate complete removal of the biomolecular contaminants from the membrane pores, it is preferred that a small amount of wetting agent be added to the caustic solution.

The wetting agent enhances removal by water flushing of proteins and polysaccharides (biomolecules) from the membrane. For example nonionic alkylaryl polyethers facilitate substantially complete removal of the de-absorbed protein and polysaccharide products during water flushing. It is preferred that the wetting agent be commercially available and an approved product for use with food. Ethoxylated alkyl phenol, commercially available as Triton×100 ® from Rohm & Haas Company has been approved for use with food by the United States Food and Drug Administration, and consequently is preferred for use with the process herein.

The invention contemplates addition of small amounts of the wetting agent, e.g., 0.001% to 0.1% of Triton×100 ®, and preferably 0.01%. These amounts have been found to provide an effective adjunct for the dilute caustic solution to remove the unwanted, loaded biomolecules from the microporous polyamide (Nylon 66) filter.

The effective cleaning time of the invention varies based, in part, on the type of polyamide filter used, the type of beer being filtered, the type of and concentration of the caustic solution, the temperature of the solution, etc. Notwithstanding the variations, effective cleaning times range between 6 minutes to an hour to remove most if not all of the filter pore clogging contaminants. As noted above the solution can be recycled during cleaning with the proviso that the solution remain caustic.

The cleaning action of the solution is believed to be independent of the flow rate. The examples, detailed below, include flow rates of 0.1 to 0.5 gallons per minute. At this time, however, it is believed that the flow rate is not critical to the invention. Thus, the invention contemplates greater or lesser flow rates than those reported.

Finally, after the caustic has been run through the membrane filter for an adequate cleaning period, the membrane filter is flushed with water until the filter is neutralized. Filter neutralization is commonly indicated by measuring the pH of the downstream effluent. When the downstream effluent is clear and possesses a substantially neutral pH, i.e. 6.5–7.5, the filter membrane cartridge is ready for reuse.

As a result of the foregoing process, an individual polyamide membrane filter or an array of filter cartridges can be returned to service. It has already been found that the filter membranes may subject to multiple beer filtering/cleaning cycles and still retain filtration integrity and compatibility. Such cycling provides for greater production schedule flexibility, reduces the need for excessive filter cartridge inventory, and reduces the labor associated with filter cartridge replacement. Thus, the cycling enabled by the invention provides an efficient, effective means to save money, time, and resources as well as minimizing waste and pollution.

The foregoing teachings are embodied in the Examples now provided:

EXAMPLE 1

The cleaning procedure of the invention followed cold draft beer filtration with a pleated, 10 inch long cartridge including a 0.45 μm single layer Nylon 66 membrane, supported both upstream and downstream with non-woven, polyester fibers (Reemay) is taken off line from beer filtration when it is approximately half loaded with biomolecular residue but, preferably, prior to a significant and rapid rise in pressure drop across the membrane. A 3% NaOH solution heated to a temperature of 140° F. is flushed through the membrane for 30 minutes at a flow rate or a ½ gallon per minute. The 3% NaOH (sodium hydroxide) solution includes 0.01% of Triton ×100 (ethoxylated alkyl phenol) which acts as a wetting agent to facilitate removal and de-sorption of protein and polysaccharide residue from the membrane. Following the caustic solution flush, the membrane filter cartridge is flushed with pure water to remove the biomolecular residue and to neutralize the membrane filter cartridge, i.e., where the effluent has a pH of about 7.

EXAMPLE 2

Example 2 follows the procedures of Example 1 except that the caustic solution contains 0.1% Triton×100, and a flush flow rate of a ½ gallon per minute for 6 minutes.

EXAMPLE 3

A solution of 1% NaOH and 0.05% Triton×100 is heated to 160° F. and flushed through a 0.65 μm membrane for approximately 1 hour at a flow rate of 0.25 gallons per minute. The membrane is then rendered neutral with water flushing.

EXAMPLE 4

A 2% NaOH solution heated to a temperature of 160° F. is flushed through the membrane for 30 minutes at a flow rate of 0.25 gallons per minute followed by water flushing.

EXAMPLE 5

A solution of 4% NaOH solution and 0.01% of Triton×100 is heated to a temperature of 130° F. and flushed at a flow rate of ½ gallon per minute for 12 minutes followed by water flushing until the effluent from the membrane has a substantially neutral pH.

EXAMPLE 6

A 10% NaOH solution with 0.01% Triton×100 is maintained at room temperature approximately 70° F. and flushed through the filter for 15 minutes at a flow rate of 0.2 gallons per minute. The membrane is then flushed with water until the affluent therefrom has a substantially neutral pH.

EXAMPLE 7

A caustic solution composed of 2% NaOH, 2% Ca(OH)$_2$ (calcium hydroxide) and 0.02% Triton×100 heated to a temperature of 140° is flushed through a membrane cartridge, as described in Example 1, for 30 minutes at a flow rate of approximately 0.25 gallons per minute. A water flush follows until the effluent from the filter has a substantially neutral pH (about 7).

EXAMPLE 8

Following use in cold draft beer filtration until it is about half loaded with biomolecular residue (prior to a significant and rapid rise in filter back pressure), a filter cartridge as described in Example 1, is taken off line. The cartridge is flushed with a 3% KOH and 0.01% of Triton×100 solution heated to a temperature of 140° F. for about 30 minutes at a flow rate of a ½ gallon per minute. Following the caustic solution flush, the membrane and system is flushed with pure water to remove the biomolecular residue and to neutralize the filter member. Following rinsing, the cartridge is put back on line and beer filtration resumed.

Industrial Applicability

This invention defines a cleaning method for polyamide membrane filters employed in cold beer filtration to reduce bacteriologic titer to acceptable levels. The invention prolongs the use of microporous polyamide membranes by permitting non-destructive cleaning with a dilute caustic solution to remove and/or de-absorb proteins, polysaccharides, and the like, which have become loaded into the membrane pores. After cleaning and flushing, the membranes are returned to on line use in cold draft beer filtration.

Given the foregoing, variations and modifications to the invention should now be apparent to a person having ordinary skill in the art. These variations and modifications are intended to fall within the scope and spirit of the invention as defined by the following claims.

What is claimed is:

1. A method for cleaning a polyamide microporous membrane filter used in filtering beer, comprising the steps of: passing a dilute alkaline solution through the polyamide beer filter at a temperature which is at least room temperature but does not exceed a temperature which is destructive to the membrane to remove proteins and polysaccharides therefrom, and flushing the filter membrane with water.

2. The method of claim 1 where the dilute alkaline solution is caustic.

3. The method of claim 1 where the alkali used in the dilute alkaline solution is 1%–10% sodium hydroxide.

4. The method of claim 3 where the dilute solution is 3% sodium hydroxide.

5. The method of claim 1 further comprising the step of adding a wetting agent to the dilute alkaline solution.

6. The method of claim 4 further comprising the step of adding a wetting agent to the sodium hydroxide solution.

7. The method of claim 5 where the wetting agent is a nonionic alkylaryl polyether alcohol.

8. The method of claim 6 where the wetting agent is a nonionic alkylaryl polyether alcohol.

9. The method of claim 8 where the wetting agent is ethoxylated alkyl phenol.

10. The method of claim 1 where the temperature ranges from ambient to 160° F.

11. The method of claim 9 where the temperature is about 140° F.

12. The method of claim 1 where the dilute alkaline solution is passed through the filter membrane for 0.1 to 1.0 hours.

13. The method of claim 11 where the dilute sodium hydroxide solution is passed through the filter membrane for 0.1 to 0.5 hours.

14. The method of claim 1 where the flow rate of the dilute alkaline solution is passed through the filter membrane is 0.05 to 0.5 gpm.

15. The method of claim 11 where the flow rate of the dilute sodium hydroxide solution is passed through the filter membrane is 0.05 to 0.5 gpm.

16. The method of claim 1 where the filter is flushed with water to remove de-absorbed proteins and polysaccharides until the effluent from the filter membrane has a pH of about 7.

17. The method of claim 15 where the filter is flushed with water to remove the degraded proteins and polysaccharides until the effluent from the filter membrane has a pH of about 7.

18. A method for cleaning polyamide membrane beer filters used in cold draft beer filtration to reduce the bacterial titer to acceptable levels, comprising the steps of:

passing a dilute solution of sodium hydroxide and a wetting agent through a beer filter including a single-layer, supported, water-wettable, alcohol-insoluble, microporous, polyamide membrane having a pore rating of about 0.45 μm–0.8 μm at a temperature, which is at least room temperature but does not exceed a temperature which is destructive to the membrane, for at least 0.1 hour to remove proteins and polysaccharides from pores of the membrane, and flushing the degraded proteins and polysaccharides from the membrane with water until the pH of the effluent water from the membrane is substantially neutral.

19. The method of claim 18 where the dilute solution is 3% sodium hydroxide and 0.01% ethoxylated alkyl phenol, the solution is heated to a temperature of about 140° F., and the solution is passed through the membrane for 0.1 to 0.5 hours.

20. A method recycling polyamide filters used for filter cold draft beer to reduce the bacterial titer to acceptable levels, comprising the steps of:

passing cold draft beer through a supported water-wettable, alcohol-insoluble, microporous, polyamide membrane until the membrane pores are partially blocked with proteins and polysaccharides;

taking the filter off-line from beer filtration;

passing a dilute solution of sodium hydroxide and a wetting agent at a temperature which is at least room temperature but does not exceed a temperature which is destructive to the membrane, for at least 0.1 hour, through the polyamide membrane having a pore rating of about 0.45 μm–0.8 μm to remove the proteins and polysaccharides from the membrane pores;

flushing the membrane with water until the pH of the effluent water from the membrane is substantially neutral; and placing the cleaned cartridge on-line for further beer filtration.

* * * * *